(12) United States Patent
Deixler et al.

(10) Patent No.: US 11,343,897 B2
(45) Date of Patent: May 24, 2022

(54) CONTROLLER FOR CONTROLLING A WIRELESS NETWORK TO PERFORM RADIOFREQUENCY-BASED MOTION DETECTION

(71) Applicant: SIGNIFY HOLDING B.V., Eindhoven (NL)

(72) Inventors: Peter Deixler, Arlington, MA (US); Hugo Jose Krajnc, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/272,293

(22) PCT Filed: Aug. 23, 2019

(86) PCT No.: PCT/EP2019/072545
§ 371 (c)(1),
(2) Date: Feb. 27, 2021

(87) PCT Pub. No.: WO2020/043606
PCT Pub. Date: Mar. 5, 2020

(65) Prior Publication Data
US 2021/0185790 A1 Jun. 17, 2021

(30) Foreign Application Priority Data
Aug. 28, 2018 (EP) .................................. 18191050

(51) Int. Cl.
*H05B 47/115* (2020.01)
*H05B 47/19* (2020.01)
*H04W 4/33* (2018.01)

(52) U.S. Cl.
CPC .............. *H05B 47/19* (2020.01); *H04W 4/33* (2018.02); *H05B 47/115* (2020.01)

(58) Field of Classification Search
CPC ...... H05B 47/115; H05B 47/19; Y02B 20/40; H04W 4/33; H04W 4/027; H04B 17/27; H04B 17/318
See application file for complete search history.

(56) References Cited

U.S. PATENT DOCUMENTS 6,826,607 B1 * 11/2004 Gelvin .................... G06F 9/468
709/224
8,981,671 B2  3/2015 Karasawa et al.
(Continued)

FOREIGN PATENT DOCUMENTS

WO  2016134976 A1  9/2016

*Primary Examiner* — Haissa Philogene

(57) ABSTRACT

The invention provides a controller, system, method, and computer program product for controlling a wireless network to perform radiofrequency-based motion detection. Thereto, the invention provides a controller for controlling a wireless network comprising a plurality of nodes to perform radiofrequency-based motion detection, wherein each unique pair of the plurality of nodes forms a respective node pair and collectively results in a plurality of node pairs, wherein the controller is configured to: select a reference node pair from the plurality of node pairs; obtain at least one reference characteristic of the reference node pair; select a subset of node pairs from the plurality of node pairs, wherein each respective node pair in the subset of node pairs comprises a respective characteristic matching the at least one reference characteristic; perform the radiofrequency-based motion detection with said subset of node pairs.

15 Claims, 3 Drawing Sheets

(56) References Cited

U.S. PATENT DOCUMENTS

| | | |
|---|---|---|
| 9,723,693 B1 | 8/2017 | Megginson et al. |
| 9,986,623 B1 | 5/2018 | Miu et al. |
| 2011/0312279 A1 | 12/2011 | Tsai et al. |
| 2018/0012641 A1 | 1/2018 | Wootton et al. |
| 2019/0287063 A1* | 9/2019 | Skaaksrud ............. B25J 9/1679 |
| 2020/0196110 A1* | 6/2020 | Jakobsson ............ H04B 1/7143 |

* cited by examiner

CONTROLLER FOR CONTROLLING A WIRELESS NETWORK TO PERFORM RADIOFREQUENCY-BASED MOTION DETECTION

CROSS-REFERENCE TO PRIOR APPLICATIONS

This application is the U.S. National Phase application under 35 U.S.C. § 371 of International Application No. PCT/EP2019/072545, filed on Aug. 23, 2019, which claims the benefit of European Patent Application No. 18191050.6, filed on Aug. 28, 2018. These applications are hereby incorporated by reference herein.

FIELD OF THE INVENTION

The invention relates to a controller for controlling a wireless network comprising a plurality of nodes to perform radiofrequency-based motion detection. The invention further relates to a system of controlling a wireless network comprising a plurality of nodes to perform radiofrequency-based motion detection. The invention further relates to a method of controlling a wireless network comprising a plurality of nodes to perform radiofrequency-based motion detection; and a corresponding computer program product for performing said method.

BACKGROUND OF THE INVENTION

Such a plurality of nodes performing radiofrequency-based motion detection may be known in the art. For example, a mesh network with radiofrequency (RF) based sensing technology may be used to detect the motion of people within an area of interest. In some examples, such a mesh network is solely dedicated to radiofrequency-based motion detection. Nodes of such a mesh network may therefore be optimally positioned to cover the area of interest accordingly.

However, in many other examples, such a mesh network is not solely dedicated to radiofrequency-based motion detection. For example, the positioning (or placement) may depend on another primary function of the node, such as e.g. fulfilling a lighting requirement or having a mounting constraint. A disadvantage of radiofrequency-based motion detection with such a mesh network is that the nodes of the mesh network may not be optimally positioned within said area of interest, in order to accurately detect motion or to do so with minimum impact to the rest of a system. Radiofrequency-based motion detection may therefore suffer in accuracy and/or unnecessary crowd the radiofrequency spectrum with reports from (less optimally positioned) nodes comprising less relevant radiofrequency signals (suited for the radiofrequency-based motion detection).

SUMMARY OF THE INVENTION

It is an object of the invention to provide an improved controller for performing radiofrequency-based motion detection, which at least alleviates the problems mentioned above. Thereto, the invention provides a controller for controlling a wireless network comprising a plurality of nodes to perform radiofrequency-based motion detection, wherein each unique pair of the plurality of nodes forms a respective node pair and collectively results in a plurality of node pairs, wherein the controller is configured to: select a reference node pair from the plurality of node pairs; obtain at least one reference characteristic of the reference node pair; select a subset of node pairs from the plurality of node pairs, wherein each respective node pair in the subset of node pairs comprises a respective characteristic matching the at least one reference characteristic; perform the radiofrequency-based motion detection with said subset of node pairs.

Hence, a controller is provided for controlling a wireless network to perform radiofrequency-based motion detection. Said wireless network comprises a plurality of nodes and is arranged for performing the radiofrequency-based motion detection. Such nodes may comprise wireless connectivity and operating intelligence. Such nodes may detect wireless communication signals exchanged within the wireless network, and record and report their radiofrequency observations to the controller. Moreover, within said wireless network, each unique pair of the plurality of nodes may form a respective node pair. For example, when four unique nodes (e.g. A, B, C, D) are present, six unique node pairs may be formed (e.g. AB, AC, AD, BC, BD, CD). Thus, each unique pair of the plurality of nodes results collectively in a plurality of node pairs. In aspects, situations may arise where said four unique nodes (A, B, C, or D) do not share the same HW/RF characteristics (e.g. due to different antenna type, different Tx power but same Rx sensitivity, etc.). Therefore, unique node pairs may also be defined by assessing which node is the transmitter and which node is the receiver, such that e.g. AB and BA are different pairs, and so forth.

The nodes of the respective node pair may exchange wireless communication signals with each other. Such an exchange of wireless communication signals may be used for radiofrequency-based sensing, such as radiofrequency-based motion detection. For example, in respect to an established baseline, a detection pattern may be determined by measuring a change of a parameter of the wireless communication signals exchanged between nodes of a respective node pair; wherein the change of the parameter may result from an interaction with said wireless communication signals. This change may also be phrased as a permutation(s) recorded by the respective node pair. This interaction may for example be rendered by an object to be detected, which may interfere, disturb, delay, adsorb, and/or reflect said wireless communication signals exchanged between nodes of the respective node pair.

Some node pairs of the plurality of node pairs (of the wireless network) may be positioned optimally for detecting said motion. Their recorded permutations may be relevant for the radiofrequency-based motion detection. However, some node pairs of the plurality of node pairs (of the wireless network) may be positioned less optimally for detecting said motion. Their recorded permutations may be less relevant for the radiofrequency-based motion detection. When considering the permutations of all node pairs of the plurality of node pairs for the radiofrequency-based motion detection, all node pairs of the plurality of node pairs may report back to the controller, and thereby unnecessarily occupy the wireless network and/or unnecessarily burden a processing power of the controller. Therefore, a clear need is present to arbitrate between the node pairs of the plurality of node pairs and save bandwidth, when performing said radiofrequency-based motion detection.

The present invention advantageously leverages the respective node pairs which are relevant for the radiofrequency-based motion detection, and mitigates the disadvantageous contribution of the respective node pairs which are (at that moment, in operation) less relevant for the radiofrequency-based motion detection.

Namely: The controller according to the invention is configured to select a reference node pair from the plurality of node pairs. This reference node pair may e.g. be characterized as most suited and/or most exemplar for the (particular) motion to be detected via the radiofrequency-based motion detection. Moreover, an at least one reference characteristic may characterize the reference node pair. This at least one reference characteristic may for example comprise: a physical feature of a node of the reference node pair itself; or a physical feature in an area surrounding a node of the reference node pair; or a detection property of said reference node pair (e.g. its measurements or perturbations).

Hence, since the at least one reference characteristic may be a well-suited property for arbitrating between the reference node pairs of the plurality of node pairs, the controller according to the invention is configured to obtain at least one reference characteristic of the reference node pair. Further: The controller is configured to select a subset of node pairs from the plurality of node pairs, wherein each respective node pair in the subset of node pairs comprises a respective characteristic matching the at least one reference characteristic. The controller is furthermore configured to perform the radiofrequency-based motion detection with said subset of node pairs. As a result, a subset is selected (or: obtained, or: found) comprising node pairs with a characteristic matching (or: similar to) the reference node pair. Thereby, radiofrequency-based motion detection may be performed with only a subset of node pairs, which subset may be well-suited for detecting said motion via radiofrequency-based motion detection and for rendering relevant permutations, and may not be performed with all node pairs of the plurality of node pairs, which may include less relevant node pairs for detecting said motion via radiofrequency-based motion detection and which may therefore unnecessarily occupy bandwidth or crowd the RF spectrum.

All in all, the present invention provides a controller for controlling a wireless network to perform radiofrequency-based motion detection, wherein the radiofrequency-based motion detection is controlled in a more effective, more efficient, less resource intensive, more (computationally) economic fashion.

For example: Motion of a person, whom is moving within an office, may be more accurately detected by a pair of wall switches with co-located RF-based sensing technology compared to a pair of ceiling-mounted luminaires with co-located RF-based sensing technology. Namely, said pair of wall switches may e.g. be characterized by a (commonly seen) placement at center-body-height. Said wall switches may therefore be prone to a more prominent interaction of said moving person with wireless communication signals exchanged between the wall switches of said pair of wall switches. Contrary to this, said pair of ceiling-mounted luminaires may e.g. be characterized by a (commonly seen) placement (high) above and perpendicular to the floor of the office (i.e. the moving plane of the person). Therefore, said ceiling-mounted luminaires may be able to detect the person via radiofrequency-based motion detection, but due to their placement may be prone to a less prominent interaction of said moving person with wireless communication signals exchanged between the luminaires of said pair of luminaires. The recorded (RF) permutations of the pair of ceiling-mounted luminaires may therefore be less accurate, less efficient, and/or less relevant compared to the recorded permutations of the pair of wall switches for detecting the motion of the moving person in the office.

Thus, according to the present invention, a controller for controlling a wireless network to perform radiofrequency-based motion detection may be provided within said office for detecting the motion of the person. Said wireless network may comprise a plurality of nodes within said office, including said pair of wall switches and said pair of ceiling-mounted luminaires, but also comprising further wall switches within said office and further ceiling-mounted luminaires within said office. The controller may then be configured to select the pair of wall switches as a reference node pair. For example, said selecting by means of a user input indicative of the wall switches, or alternatively by determining that the wall switches provide the best detection (e.g. in terms of resolution or signal strength) of a person. The at least one characteristic of this reference node pair (i.e. the pair of wall switches) may be a type of one of its corresponding nodes. That is: here, the type "wall switch" may be the at least one reference characteristic. The controller may subsequently select a subset of node pairs from the plurality of node pairs, wherein each respective node pair in the subset of node pairs comprises a respective characteristic matching the at least one reference characteristic. Thus, the controller may select a subset comprising all wall switches within the office. The radiofrequency-based motion detection for detecting the motion of the person within said office may therefore be performed with only the (permutations of the) wall switches within the office, and not be performed with the (permutations of the) ceiling-mounted luminaires within the office. Alternatively, another reference characteristic (either taken separately or in addition to the 'type' mentioned before) may for example be the height of placement, e.g. center-body-height of a person. Such an alternative reference characteristic may render that also smart thermostats (which may be part of the wireless network) positioned at center-body-height may be included in said selected subset (next to the wall switches).

Hence, as the wall switches alone may be sufficient (and well-suited) to perform the radiofrequency-based motion detection of the moving person within the office, the ceiling-mounted luminaires may be superfluous for performing said radiofrequency-based motion detection. The permutations recorded by said ceiling-mounted luminaires may therefore not be required, or may not be considered in the processing, or may not be requested by the controller (only permutations of the wall switches are requested and/or considered), thereby saving bandwidth within the wireless network, and economizing the effort to detect the motion. The ceiling-mounted luminaires may therefore be prevented to unnecessarily occupy bandwidth or crowd the RF spectrum. Thereby, a more effective, more efficient and/or more economic control is provided for detecting the motion of the person via radiofrequency-based motion detection with the wireless network within said office.

As mentioned, the controller is configured to perform the radiofrequency-based motion detection with said subset of node pairs. Thus, the controller may still be able to take into account some node pairs of the plurality of node pairs (or of another wireless network) which are not belonging to said subset of node pairs whenever necessary. For example, whenever considering a selected subset of wall switches, the controller may still be able to receive or request permutations of a device not being a wall switch, e.g. when a particular wall switch fails and/or is not present within a particular area to be considered. However, as discussed above, it may be advantageous to solely consider the subset of node pairs for the radiofrequency-based motion detection, without considering any superfluous other node pairs not belonging to said subset. Hence, in an embodiment, the controller may be configured to perform the radiofrequency-based motion detection with only said subset of node pairs.

Furthermore, in an embodiment, the controller may be configured to discard a set of node pairs not belonging to said subset of node pairs from the radiofrequency-based motion detection. Thus, in examples, the controller may e.g. still be able to listen and/or receive the permutations of the node pairs not belonging to said subset, but may not consider said node pairs in the radiofrequency-based motion detection, which may improve the accuracy, computational effort and speed of the radiofrequency-based motion detection. In other conditions, the controller may not receive said permutations, and/or even instruct said node pairs not belonging to said subset of node pairs to temporality not communicate their permutations to the controller. Thus, the controller may be controlling said wireless network and the radiofrequency-based motion detection process associated therewith. Hence, in an embodiment, the controller may be configured to control the amount of network traffic to be exchanged between nodes of the respective node pairs for performing the radio-frequency based motion detection; wherein the network traffic exchanged between the nodes of the respective node pairs in the subset of node pairs may be increased, and/or wherein the network traffic exchanged between the nodes of the respective node pairs in the set of node pairs not belonging to said subset of node pairs may be decreased. Here, controlling the amount of network traffic to be exchanged between nodes of the respective node pairs may be done by the controller sending instructions to said respective node pairs to change its messaging/wireless communication signaling properties.

As partly mentioned, the at least one reference characteristic may characterize the reference node pair. The at least one reference characteristic may e.g. comprise a detection property of said reference node pair (e.g. its measurements or perturbations). Hence, in an embodiment, the controller may be configured to: obtain, for each respective node pair, wireless communication signals exchanged between nodes of the respective node pair; determine, for each respective node pair, a detection pattern from the respective wireless communication signals by measuring a change of a parameter of the respective wireless communication signals resulting from an interaction with said respective wireless communication signals; and wherein said reference characteristic may be the detection pattern of the reference node pair, and wherein said respective characteristic may be the detection pattern of each respective node pair. Such an embodiment is advantageous, because the detection pattern of a respective node pair of the plurality of node pairs is compared with the detection pattern of the reference node pair, and upon matching, said respective node pair is comprised within the subset of node pairs; the subset with at least which the controller is configured to perform the radiofrequency-based motion detection. Thus, considering such an embodiment, it is ensured that the radiofrequency-based motion detection is performed with node pairs having more relevant permutations and/or more accurate detection patterns. Such a detection pattern may alternatively be phrased as a detection signature throughout.

Moreover, said wireless communication signals may for example be unicast messages, multicast messages, broadcast messages, interpan messages, software updates, control commands, etc.

In an embodiment, the at least one reference characteristic may be one or more detection patterns of the reference node pair. Said one or more detection patterns may for example comprise a detection pattern corresponding to a first object (e.g. a person) detected, a second object (e.g. a person) detected, and/or one or more further objects (e.g. persons) detected. Thereby, having one or more detection patterns of the reference node pair, the controller may distinguish between said objects with the radiofrequency-based motion detection (e.g. via their classified body mass). Thus, said selected subset of nodes may comprise the respective node pairs which are able to and/or suited for detecting motion corresponding to the one or more detection patterns, e.g. the one or more objects (e.g. persons) detected (initially with) the reference node pair.

In aspects, the parameter may be a network diagnostic. For example, the wireless communication signals (e.g. a message) may comprise a network diagnostic, which may be affected during transmission, due to said interaction. In an embodiment, the parameter may be an RSSI value. Such RSSI value may be affected accordingly by an object to be detected, hence may provide a proper parameter to perform the measuring according to the invention (i.e. performing part of the radiofrequency-based motion detection).

However, said parameter may not only be an RSSI value. Said parameter may also be another parameter in the domain of wireless communication and/or communications. The parameter may for example be a performance property of a message exchanged between nodes of a respective node pair. Hence, in examples, the parameter may be a delay in reception. For example, when one node of the respective node pair sends a wireless communication signal (e.g. a message) to another node of the respective node pair, the message may be expected within a particular time window, but may be delayed due to an interaction with said respective wireless communication signals. Thus, such a delay in reception may be a well-suited parameter to perform radiofrequency-based motion detection and the detection pattern determined therefrom may serve as a reference characteristic of the at least one reference characteristic.

Moreover, in aspects, said delay in reception may also define said detection pattern, irrespective of said delay being caused by an interaction with said respective wireless communication signals. For example, when said parameter is being a RSSI, RSSI values of −80, −82, −84 and −96 may in a normal situation be received with 100 milliseconds apart. However, whenever said last value of −96 may be received 500 milliseconds after the previous RSSI value of −84, the detection pattern may render a totally different pattern. The former rendering a slope at the final received value, whereas the latter (delayed situation) rendering a linear progression in the detection pattern.

Similarly, in an example, the parameter may be a number of retries. For example, when one node of the respective node pair sends a wireless communication signal (e.g. a message) to another node of the respective node pair, the message may not be correctly sent the first time, or not fully sent the first time, due to an interaction with said respective wireless communication signals. Thus, the number of retries may be a well-suited parameter to perform radiofrequency-based motion detection and the detection pattern determined therefrom serve as a reference characteristic of the at least one reference characteristic.

Similarly, in an example, the parameter may be a transmit power of a sent wireless communication signal.

The parameter may also be at least one of the parameters above, hence a combination of at least some of the parameters mentioned above, such as an aggregate metric.

Thus, said detection pattern may serve as the reference characteristic. The controller may therefore be configured to select a subset of node pairs from the plurality of node pairs, wherein each respective node pair in the subset of node pairs comprises a detection pattern of each respective node pair matching the at least one detection pattern of the reference node pair. (E.g. the former may be phrased as a respective detection pattern and the latter may be phrased as a reference detection pattern). Subsequently, the controller may be configured to perform the radiofrequency-based motion detection with e.g. said subset of node pairs. Matching said detection patterns may comprise matching one or more properties of the detected pattern. Hence, in aspects, said matching of the reference characteristic and the respective characteristic may comprise matching via statistical analysis of a detection pattern and/or via pattern analysis of a detection pattern.

Hence, in an embodiment, The controller according to the invention is provided, wherein said matching of the reference characteristic and the respective characteristic may comprise matching one of: a shape of the detection pattern; a height of a peak of the detection pattern relative to a baseline; a depth of a peak of the detection pattern relative to a baseline; an area covered by the detection pattern relative to a baseline; a duration of the detection pattern; a classification of the detection pattern; a periodicity of the detection pattern; a history of previously detected detection patterns.

For example, a peak comprised within a detection pattern of a sitting person (relative to a baseline), which may be detected by means of a node pair comprising a wall switch, may match a peak comprised within a detection pattern of the same (or other) sitting person (relative to a baseline), which may be detected by means of a node pair comprising a smart thermostat. Said matching may comprise assessing a height, a curvature, an integral, a power, and/or a slope of said peak. Further, for example, a shape of a detection pattern may be matched with another detection pattern. Such a shape may e.g. be a peak, a function, a particular combination of detected peaks, a discontinuity, an asymptote, a step of a step function, etc. Moreover, an area enclosed (or: covered, or: bound) by a detection pattern relative to a baseline may be used in said matching of the detection pattern of the reference node pair and any one of the detection patterns of the respective node pairs. Such an area (e.g. determined by calculus, integral mathematics) may be indicative of an energy content of such a detection pattern. For example, a detection pattern corresponding to a fat person may comprise a higher energy signature compared to a skinny person.

Further: a classification of the detection pattern may comprise that a respective node, or a respective node pair, comprises intelligence to classify the detection pattern accordingly. For example, a detection pattern determined by a node pair may be classified by said node pair as 'a sitting person'. Another node pair may classify a detection pattern determined thereby as 'a standing person'. A classification of 'a standing person' may therefore not match with a classification of 'a sitting person', hence the corresponding node pairs do not comprise a characteristic which matches, hence are not belonging to a same subset of node pairs. Further: a duration of a detection pattern may moreover be well suited to compare a reference characteristic (i.e. reference detection pattern) of a reference node pair with a respective characteristic (i.e. respective detection pattern) of a respective node pair. Namely: due to motion of an object, a detection pattern may be detected/formed during a particular moment/duration of time. For example: in some instances, a detection pattern may not be accurate enough to classify a particular motion, but may still indicate that motion may be present. Activity such as playing, working, etcetera may still be recognized by the duration of the detection pattern. A maintenance engineer working under a light pole may cause a detection pattern with a duration of e.g. five minutes each time of maintenance. The selection of the subset of node pairs from the plurality of node pairs may therefore be made such that the subset comprises all node pairs currently detecting such a detection pattern with such a five minutes duration of activity, and/or previously having detected such a detection pattern with such a five minutes duration of activity. Hence, during maintenance of light poles, only the node pairs relevant for detecting said maintenance activity may be used in the radiofrequency-based motion detection, such that other node pairs may not be unnecessarily included in the radiofrequency-based motion detection.

Furthermore, as partly mentioned before: Said matching of the reference characteristic and the respective characteristic may comprise matching a history of previously detected detection patterns. For example, whenever a reference node pair comprises a history of certain number of false positives detected, e.g. below a defined threshold value of false positives, and a respective node pair comprises a number of false positives below said threshold value, the matching may be established based thereupon. Thus, a subset of the respective node pairs which render a certain number of false positives (within the threshold) may be considered for the radiofrequency-based motion detection. Mutatis mutandis, false negatives, or any other detection metric may be considered within the history of the previously detected detection patterns. Further: for example, whenever a reference node pair is located at an entrance (i.e. e.g. a subspace) and is characterized by (nearly substantially always) detect a person walking in through the entrance, a history of previously detected detection patterns corresponding to said reference node pair may comprise an indication of (a historical classification of) 'walking persons'. Said matching according to the invention may then comprise matching respective node pairs comprising a similar history of detected detection patterns comprising an indication of (a historical classification of) 'walking persons'. Thus, respective node pairs which may comprise a history of previously detected detection patterns comprising an indication of (a historical classification of) 'sitting persons' may not match. Therefore, only the node pairs which are characterized by a particular history of detection patterns may be considered for the radiofrequency-based motion detection (e.g. the nodes present at entrances and/or exits).

For example, during an activity within the room, e.g. during Wi-Fi streaming of movie, the wireless interference in said room may influence the radiofrequency-based motion detection, i.e. the detection pattern of the respective node pairs. Such an interference/interaction may also be identified in the detection pattern and be utilized for matching of the reference characteristic and the respective characteristic. Similarly, prediction of an activity level, e.g. a person enters a room at 08.00 PM and sits down on the couch to watch TV versus a person entering said room at 09.00 AM to walk into it for picking up keys. As a detection pattern is expected, but whenever said detection pattern does not occur, such an interaction may be a feature in the respective detection pattern to utilize for matching of the reference characteristic and the respective characteristic.

Said matching of the at least one reference characteristic and the respective characteristic may comprise matching any one of the features mentioned above, or a combination thereof.

As partly mentioned, the at least one reference characteristic may characterize the reference node pair. The at least one reference characteristic may e.g. be a physical feature of a node of the reference node pair itself (see for example the example provided above with the wall switches and the ceiling-mounted luminaires). This may be advantageous, as a physical property of the reference node pair may be well indicative of the quality of the radiofrequency-based motion detection of a motion to be detected due to similarities between node pairs. The at least one reference characteristic may also e.g. be a physical feature in an area surrounding a node of the reference node pair, but is not attributable to said node of the reference node pair itself, e.g. an architectural column in front of a node. Similar advantages may be provided by determining such features as a reference characteristic and/or respective characteristic.

Hence, in an embodiment, the reference characteristic and the respective characteristic may comprise at least one of: a material of a node; a pre-defined combination of a node material of the nodes of the reference node pair; an orientation of a node; a location relative to a wall and/or surface area; a distance between nodes of the respective node pair; a node type; a control setting; a classification of an activity detected by the reference node pair; a classification of a type of space in which the reference node pair is present; a power supply type and/or status of a node; a transmit power of a node; a software edition of an operating system of a node.

Said reference node pair may comprise a material. Said material may be of either a node of the reference node pair, or of both the nodes of the reference node pair. Said material may for example be: a polymer such as e.g. PE, PET, PVC, ABS, HDPE, etc.; a metal such as e.g. copper, steel, iron, aluminum; a ceramic, such as glass; a composite, such as carbon fiber reinforced laminates, etc.; and/or wood; or a combination thereof. Thus, said reference node pair may comprise a material such as steel (e.g. a luminaire with a steel housing), wherein the subset of node pairs may comprise respective node pairs also of steel (e g luminaires, sensors, appliances, all with a steel housing), because nodes comprising steel may be more suited for radiofrequency-based motion detection in some examples due to e.g. reflective properties.

Similarly, said pre-defined combination of a node material of the nodes of the reference node pair. For example, a particular radiofrequency-based detection may be best performed by assessing permutations between a steel node pairing with a polymer node, because the steel node may render reflections and directionality to an omnidirectional uniformly receiving polymer node. Such combinations may also be considered as a reference characteristic of the reference node pair.

Said reference node pair may comprise an orientation. Said material may be of either a node of the reference node pair, or of both the nodes of the reference node pair. Furthermore, said subset may thus comprise node pairs having: a matching orientation (e.g. all looking downward or towards a particular space); a matching location relative to a wall and/or surface (e.g. all node pairs wherein at least one node of the node pair is adjacent to a window or a corridor); a matching distance between nodes of the respective node pair (e.g. only consider nodes being positioned (shortest distance) one meter apart, or at most two meter apart, or at most four meter apart); a matching node type (e.g. a device type such as 'wall switch', 'luminaire', 'luminaire-wall switch combination' 'domestic appliance', 'lighting device', 'table lamp', 'mobile device', or any other combinations therebetween, etc.). Moreover, node type may also comprise a serial number of a node, such that nodes having a similar serial number, or part of a serial number, may match, such as a set of Hue bulbs or LED drivers with a similar serial number; a matching control setting (e.g. a play of a lighting scene versus a simple on/off of a light source); a matching classification of an activity detected by the reference node pair the subset of node pairs comprises node pairs detecting sitting persons, detecting walking persons, detecting playing persons, etc.); a matching a classification of a type of space in which the reference node pair is present (e.g. a kitchen, an office, a first cubicle, a second cubicle, a house, an address, an entry to a room, an exit to a room, a passage in-between spaces, a playroom, etc.).

Said reference characteristic of the reference node pair and/or the respective characteristic of the respective node pair may comprise a power supply type and/or status of a node. For example, selecting the subset of node pairs may be based on the power supply type of a node and/or node pair, such as arbitrating between battery powered nodes and mains powered nodes (or node pairs, e.g. one node of the node pair may be battery powered). More specifically, battery life may also be a reference characteristic, such that only nodes with sufficient battery life may be comprised within the subset according to the invention. Moreover, the reference characteristic and the respective characteristic may comprise the available wireless spectrum of reception/ transmission. Yet alternatively, sensitivity of the node in sending/receiving may be a reference characteristic. This may also be related to the type of the node.

Similarly, said reference characteristic of the reference node pair and/or the respective characteristic of the respective node pair may comprise a transmit power of a node and/or a software edition of an operating system of a node. The former may be advantageous, because the subset may be established by taking into account only node pairs with a certain threshold in transmit power. The latter may be advantageous, because the subset may be established by taking into account only node pairs with a certain version in operating system, thereby facilitating the processing of the signals as older operating systems and messages may require the controller to perform translations.

Moreover, as partly mentioned before, some node pairs of the plurality of node pairs (of the wireless network) may be positioned optimally for detecting said motion. Their recorded permutations may be relevant for the radiofrequency-based motion detection. However, some node pairs of the plurality of node pairs (of the wireless network) may be positioned less optimally for detecting said motion. Their recorded permutations may be less relevant for the radiofrequency-based motion detection. Moreover, as mentioned, the at least one reference characteristic may be a well-suited property for arbitrating between the reference node pairs of the plurality of node pairs. Said node pairs of the plurality of node pairs having a matching characteristic (i.e. the at least one reference characteristic and the respective characteristic match) may however be located at a different location within a space.

Hence, in an embodiment, the reference node pair may be located within a first subspace and at least one node pair of the plurality of node pairs may be located within a second subspace; wherein the first subspace may be different to the second subspace. Said first subspace and/or second subspace may be e.g. one of: a section of an office floor, a section of a room, a playing area, a kitchen, an entrance region, an exit region, a checkout region, a shelve, a retail segment, a corner, a window, a window region, an edge, a corridor, a waiting area, a sports area, a sitting area within e.g. a larger area, a roof, a ceiling, a floor, a cubicle, a wall, etc.

In an embodiment, the first subspace may be a first room, and wherein the second subspace may be a second room. Alternatively, considering the wireless network being deployed within one single area (or e.g. a single room, or office floor), the first subspace may be a part of said area (such as e.g. the entrance of said exemplar room, or a corner of said exemplar office floor), and the second subspace may be another part of said area (such as e.g. the window area of said exemplar room, or another corner of said exemplar office floor). Similarly, the first subspace may be edges of a space (such as the windows and/or the entrances/exits; i.e. places which are for example sensitive to burglars entering) and the second subspace may be the central portions of a space (such as e.g. cubicles in an office). The first subspace and the second subspace may also be respectively a first cubicle and a second cubicle.

Said subset of node pairs from the plurality of node pairs may also be selected based on similarity in location. In an embodiment, the reference node pair may be located within a first subspace of a first space and at least one node pair of the plurality of node pairs may be located within a second subspace of a second space; wherein the first subspace of the first space and the second subspace of the second space may be a similar (type of) subspace, wherein the first space may be different to the second space. For example, the first space may be a first residential apartment, whereas the second space may be a second residential apartment, both e.g. within the same apartment complex and therefore both e.g. be similar in layout. The first subspace and the second subspace may be a similar type of subspace, namely being the entrance of the apartment. The reference node pair may therefore be e.g. a smart (wireless) doorbell and a smart light at said entrance. The subset of node pairs may therefore comprise all the node pairs having a characteristic being near to an entrance, hence comprise all the doorbells and smart light at the entrances of all apartments within the apartment complex. This may also mean that said wireless network may be fragmented, or consist of a plurality of sub-wireless-networks (e.g. LAN).

Said subspaces may also be on house level. So, a first house may learn from a second house. For example: If you have an identically built houses from the same property developer at different locations, the newly built house can get a head-start on learning in the radiofrequency-based sensing by re-using already defined reference node pairs obtained at an earlier built house.

In an embodiment, the wireless network is at least a wireless lighting network. Since a wireless lighting network may comprise a plurality of nodes with a high density, which may moreover be distributed in an array within an area, or moreover logically within an area, the wireless network being a wireless lighting network may be advantageous for radiofrequency-based motion detection. The wireless lighting network may also interact with other wireless networks, such as a home automation network or wireless mobile network, such that the wireless network may be even more dense. In an embodiment, the wireless network is a wireless lighting network.

In an embodiment, the wireless network is at least a home automation network. In an embodiment, the wireless network is a home automation network. Such a home automation network may be advantageous as many different devices (e.g. at different locations, orientations, etc.) may be part of such a network.

In an example, the wireless network comprises only fixed nodes. Fixed nodes may be phrased as immovable nodes. Such fixed (immovable) nodes may e.g. comprise luminaires, wall switches, smart thermostats, which all may be fixed to a wall and are immovable. This is contrary to e.g. a smartphone or a wearable, which may be dynamic nodes.

In an embodiment, the plurality of nodes comprises one of: a lighting device, a wall switch, a bridge, a speaker, a television, a thermostat, a wireless sensor, a power outlet plug, a doorbell, a smart home assistant device, and/or a smart home appliance.

In an embodiment, the controller is embedded in a node of the wireless network. For example, the controller may be embedded in a bridge, a lighting device, or a wall switch, or a smart home appliance. The intelligence of the controller may moreover, in some examples, be distributed over a plurality of said nodes of said wireless network. The controller may also be a smartphone, tablet, a wearable, or similar mobile device.

As mentioned, the controller according to the invention may be configured to select a reference node pair from the plurality of node pairs. The selection of the reference node pair may for example be done during a commissioning step, for example by a person selecting said reference node pair. Hence, in an embodiment, the controller is configured to: receive a user input indicative of the reference node pair; wherein the controller is configured to select the reference node pair from the plurality of node pairs by selecting the reference node pair indicated in the user input. The user input indicative of the reference node pair may for example be a user selection of the reference node pair. The user input indicative of the reference node pair may alternatively be a user input comprising a location indicating the reference node pair, or comprising a type of device indicating the reference node pair. The controller may comprise a processing intelligence for processing such user inputs.

In an embodiment, the user input indicative of the reference node pair may comprise controlling a user interaction device. In an embodiment, the user interaction device may be a smartphone, a tablet, a smartwatch, a smart glass and/or a switch. For example, by means of controlling and/or interacting with a user interaction device, such as a smartphone, the reference node pair may be selected. This may either be direct selection: Said interaction may comprise (the user) selecting the reference node pair from a list, or alternatively put together (construct) the reference node pair from all nodes nearby (by the user itself) and thereby select the reference node pair. Moreover, an alternative example, wherein said selection is done indirectly, for example: Said controlling a user interaction device may also be navigating with said user interaction device. Navigating via said user interaction device may then be suited to (automatically) select a closest reference node pair within a defined navigational path, a reference characteristic of the at least one reference characteristic may be the adjacency to said navigational path, and the subset of node pairs may comprise node pairs matching said adjacency of said navigational path.

Further, in an embodiment, at least one node of the reference node pair may be said user interaction device. For example, controlling a wall switch may be indicative of selecting the wall switch in combination with a device the wall switch switches as the reference node pair. This reference pair may be well suited for radiofrequency-based motion detection because the person standing in front of the wall switch may be detected accurately (as his motion interacts prominently with the wireless communication signals exchanged by the wireless switch with other devices). The at least one reference characteristic may then further be a detection pattern of the reference node pair, which reference pattern may further be more easily be classified as it may be intrinsic for said wall switch that a person is standing in front of it to switch it.

Thus, in an embodiment, the user input indicative of the reference node pair may comprise switching a wall switch. In an embodiment, at least one node of the reference node pair is said wall switch.

Moreover, in an embodiment, the user input indicative of the reference node pair may comprise navigating through a space along a path. In an embodiment, at least one node of the reference node pair is said user interaction device used for said navigating.

Moreover, in an embodiment, the user input indicative of the reference node pair may comprise controlling a smartphone. In an embodiment, at least one node of the reference node pair is said smartphone.

The controller may moreover be configured to select a reference node pair from the plurality of node pairs based on an activity detected. In an embodiment, the controller may be configured to: obtain an input signal indicative of an activity; select the reference node pair from the plurality of node pairs by selecting a node pair having detected said activity in the radiofrequency-based motion detection. In this way, as the reference node pair is well-suited for detecting said activity, the subset of the respective node pairs with a respective characteristic matching the at least one reference characteristic may comprise node pairs which are all relevant and/or well-suited to detect said activity accordingly (e.g. with a substantially high resolution, with a substantially clear detection pattern, etc.).

In an embodiment, the controller may be configured to receive said input signal indicative of an activity from a user input device. Said user input device may be a user interaction device. The user may for example indicate the activity, or the activity may be derived from other (indirect) inputs, such as a behavior captured on the input device indicative of the activity. For example, navigating by means of the user input device (for example by means of an indoor positioning system based on visible light communication) may be indicative of an activity of walking. The speed through which the user input device propagates along a defined navigational path may be indicative of running (sporting). In such cases the user interaction device may e.g. be a wearable, such as a smartphone, a bracelet, a fitness tracker, smart glasses, etc.

In an embodiment, the controller may be configured to receive said input signal indicative of an activity from a sensor input device. Said sensor input device may for example be one of: a camera, a light sensor, a PIR sensor, Time of Flight sensor, a wearable device comprising a set of sensors, a RADAR sensor, a microwave sensor, a thermopile array, a NFC reader, a RFID reader, a tag reader, etc. In an embodiment, the controller may be configured to receive said input signal indicative of an activity from a number of people detected. Further, in an embodiment, the controller may be configured to receive said input signal indicative of an activity from an identifier detected within a space. The identifier may for example be detected by means of said sensor input device, or received by a device emitting said identifier, such as a beacon, or a BLE beacon, for example embedded within a user device.

In an embodiment, the controller may be configured to generate the input signal indicative of the activity by selecting the activity from a stored list of predefined activities based on a time. Thus, for example, by knowing a time, an activity may be retrieved from said stored list of predefined activities based on time. Namely, it may be known in a shopping mall that at a first time children may be playing, while at a second time a concert will be performed whereby people are sitting, while at a third time an afterparty occurs with people dancing, while at a fourth time a cleaner is active with a cleaning activity, while at a fifth time a maintenance engineer will stop by to replace a light bulb which is broken, while at a sixth time a security guard will do his regular walk around the premises of the shopping mall. Thus, said activity may be selected by retrieving the activity from said stored list based on time. The controller may thus comprise a timer and intelligence for retrieving said activity. The list may be stored within the controller or remote from the controller, for example in a backend or server. The reference node pair may therefore be selected based on an activity, and ultimately said subset of node pairs may comprise respective node pairs matching a respective characteristic in detecting said activity. Thus e.g. only node pairs detecting said activity may be used in the radiofrequency-based motion detection, while other superfluous node pairs are e.g. discarded. In other examples, by knowing a light sensor is triggered at noon, it is most likely the activity is working in the office, whereas a light sensor is triggered at midnight, it is most likely the activity is cleaning or burglary.

Further, in an embodiment, the controller may be configured to generate the input signal indicative of the activity by selecting the activity from a stored list of predefined activities based on a detected number of people detected. Further, in an embodiment, the controller may be configured to generate the input signal indicative of the activity by performing an analysis of historical activity performed within a space. Machine learning may e.g. be applied.

The controller may moreover be configured to select a reference node pair from the plurality of node pairs based on a signal strength of the detection. Said signal strength of the detection may e.g. be phrased as the signal strength of a permutation (i.e. change) measured by a respective node pair. Therefore, in an embodiment, the controller is configured to select the reference node pair from the plurality of node pairs by selecting: a node pair having a highest detected signal strength with respect to a baseline in the radiofrequency-based motion detection, or a node pair having a highest detected resolution in the radiofrequency-based motion. Such an embodiment is advantageous, as the reference node pair may comprise a highest resolution in detecting a motion, and/or activity.

The controller may moreover be configured to select a reference node pair from the plurality of node pairs based on a variation of the signals of the detection. Therefore, in an embodiment, the controller is configured to select the reference node pair from the plurality of node pairs by selecting: a node pair having a highest variation in signal strength with respect to a mean in the radiofrequency-based motion detection, or a node pair having a lowest variation in signal strength with respect to a mean in the radiofrequency-based motion. Such an embodiment is advantageous, as the reference node pair may comprise a sensitivity in detecting a motion, and/or activity. Namely, in some examples, a less scattered detection may be desired, while in other examples, a more scattered detection may be desired or may be sufficient enough. Thus, said subset of node pairs may for example comprise nodes with a low sensitivity, because that may be sufficient to perform the radiofrequency-based motion detection for a particular purpose. However, in some examples, whenever a more precise activity and corresponding motion is required to be detected, without e.g. the scattered (e.g. noise) detections of the less sensitive nodes, the subset may advantageously comprise the higher sensitive nodes to perform the radiofrequency-based motion detection.

In further aspects, the controller may be configured to select the reference node pair from the plurality of node pairs by selecting: a node pair having a lowest latency. Moreover, in an embodiment, the controller is configured to select the reference node pair from the plurality of node pairs by selecting: a node pair having a lowest number of false positives and/or false negatives detected. Yet alternatively, in further aspects, the controller may be configured to select the reference node pair from the plurality of node pairs by selecting: a node pair, wherein a first node of said node pair has a respective wireless transmission cone and a second node of said node pair has a respective wireless reception cone, and wherein the respective wireless transmission cone and the respective wireless reception cone are best in line with each other. Hereby, the respective wireless transmission cone may comprise a centerline and the respective wireless reception cone may comprise centerline, wherein said centerline of the respective wireless transmission cone and the centerline of the respective wireless reception cone intersect within a defined angular threshold, wherein said angular threshold is at least 150 degrees (whereby 180 degrees indicates e.g. that a straight line is formed by both centerlines).

In examples, a situation may arise wherein at least one node of the reference node pair does not contribute to the radiofrequency-based motion detection, e.g. due to a malfunction, a powering off, a switching off, an emergency, a blockage, a failure, a node leaving the detection area, etc. In such a situation, the originally selected reference node pair from the plurality of node pairs may not be suited for radiofrequency-based motion detection, and hence may require a substitution with a new reference node pair. Hence, in embodiments, the controller is configured, if at least one node of the reference node pair is not able to perform the radiofrequency-based motion detection, to select a new reference node pair from the plurality of node pairs; obtain at least one new reference characteristic of the new reference node pair; select a new subset of node pairs from the plurality of node pairs, wherein each respective node pair in the new subset of node pairs comprises a respective characteristic matching the at least one new reference characteristic; perform the radiofrequency-based motion detection with at least said new subset of node pairs. Thus, graceful degradation is advantageously provided.

In embodiments, said not being able to perform the radiofrequency-based motion detection may comprise the at least one node of the reference node pair being switched off. In embodiments, said not being able to perform the radiofrequency-based motion detection may comprise the at least one node of the reference node pair being in a failure or malfunctioning mode. For example, whenever an emergency luminaire enters its emergency mode. In embodiments, said not being able to perform the radiofrequency-based motion detection may comprise the at least one node of the reference node pair having a transmission power below a predefined threshold and/or having a number of wireless communication signals (e.g. messages) exchanged below a predefined threshold.

It is a further object of the invention to provide an improved system, which at least alleviates the problems and disadvantages mentioned above. Thereto, the invention further provides a system of controlling a wireless network comprising a plurality of nodes to perform radiofrequency-based motion detection, wherein the system comprises: the plurality of nodes of the wireless network; a controller according to the invention.

In an embodiment, said controller may be embedded in a node of the wireless network. In an embodiment, said controller may be embedded in at least one node of the wireless network. In an embodiment, said controller may be distributed in one or more nodes of the wireless network. In an embodiment, said controller may comprise a radiofrequency transmitter, receiver or transceiver. In an embodiment, said controller may be one of: a lighting device, a wall switch, a bridge, a speaker, a television, a thermostat, a power outlet plug, and/or a smart home appliance; or a combination thereof.

The advantages and/or embodiments applying to the controller (apparatus) according to the invention may also apply mutatis mutandis to the present system according to the invention.

It is a further object of the invention to provide an improved method of controlling a wireless network to perform radiofrequency-based motion detection, which at least alleviates the problems and disadvantages mentioned above. Thereto, the invention further provides a method of controlling a wireless network comprising a plurality of nodes to perform radiofrequency-based motion detection, wherein each unique pair of the plurality of nodes forms a respective node pair and collectively results in a plurality of node pairs, wherein the method comprises: selecting a reference node pair from the plurality of node pairs; obtaining at least one reference characteristic of the reference node pair; selecting a subset of node pairs from the plurality of node pairs, wherein each respective node pair in the subset of node pairs comprises a respective characteristic matching the at least one reference characteristic; performing the radiofrequency-based motion detection with said subset of node pairs.

In an embodiment, the method according to the invention is provided, wherein the method further comprising: obtaining, for each respective node pair, wireless communication signals exchanged between nodes of the respective node pair; determining, for each respective node pair, a detection pattern from the respective wireless communication signals by measuring a change of a parameter of the respective wireless communication signals resulting from an interaction with said respective wireless communication signals; wherein said reference characteristic is the detection pattern of the reference node pair, and wherein said respective characteristic is the detection pattern of the respective node pair.

The advantages and/or embodiments applying to the controller and/or system according to the invention may also apply mutatis mutandis to the present method according to the invention.

The invention further relates to a computer program product for controlling a wireless network to perform radiofrequency-based motion detection. Hence, the invention provides a computer program product for a computing device, the computer program product comprising computer program code to perform a method of the invention when the computer program product is run on a processing unit of the computing device. The computing device may be the controller according to the invention.

Thus, aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Further: In aspects of the invention, the reference node pair may be selected based on a received beacon signal. In embodiments, the node pair may be selected based on the location relative to a received beacon signal. For example, an object emitting a beacon signal within said wireless network may be at a particular location, and the node pair closest to the object may be selected as the reference node pair. This may be done by assessing the signal strength of the beacon signal or by assessing location information comprised therein. Further, in aspects of the invention, the reference characteristic and the respective characteristic may comprise a location relative to a received beacon signal. Such a beacon signal may for example be a Bluetooth beacon signal. Such a beacon signal may be received by either node of the reference node pair and/or the respective node pair. Based on the beacon signal, the position of the reference node pair and/or the respective node pair may be determined relative to the position of the beacon signal, e.g. by assessing the signal strength of the received beacon signal or by assessing the location information comprised within the received beacon signal. In alternative embodiments, said beacon signal may also be received by the controller according to the invention, the controller may be configured to retrieve the location of the beacon signal and thereby know/assess which node pairs of the plurality of node pairs are within a range of said beacon signal.

Thus, it may be proposed to additionally employ a Bluetooth-beacon-based sensing system to enable the RF-based sensing system according to the invention to narrow down the number of respective node pairs within a space defined for the radiofrequency-based motion detection; and/or search said space only for a specific body mass bucket (e.g. for a big person rough RF-based sensing resolution will suffice). The proposed dual-sensing system may enable to determine with less latency and/or with less network traffic.

More specifically, in a non-limiting exemplar example: Assessing (e.g. scanning) all relevant permutations of respective node pairs of the plurality of node pairs of the wireless network may take time and hence increase latency to the radiofrequency-based motion detection. Speed of this assessment may be increased by additionally employing context knowledge obtained from a beacons-based localization system (e.g. a Bluetooth based localization system). For example, Signify Hue may be capable of sensing and/or transmitting Bluetooth beacons, hence enabling to roughly locate e.g. a smartphone/wearable within an area. The proposed interaction between the Bluetooth-based-localization and radiofrequency-based motion detection makes it possible to both identify and accurately localize users. Following the installation of a system comprising multiple Signify Hue products, said system may over time be able to correlate a respective identity of users (as identified via the Bluetooth beacons) with the user's respective Radiofrequency-based-sensing body-mass bucket. The Bluetooth-beacon-based localization system may already know the approximate location of such a user and hence may create a subset of probable locations of the user. It is proposed that said system subsequently performs radiofrequency-based sensing scans only at said probable locations of the respective user, looking specifically for a specific radiofrequency-based fingerprint (e.g. detection pattern) of the known user. This may enable the proposed dual-sensing system (Bluetooth based localization system in combination with the radiofrequency-based motion detection (system)) to determine with less latency and/or with less network traffic the current location of the user. In other words, the knowledge obtained from the Bluetooth-beacon-based sensing system may enable the radiofrequency-based motion detection (system) to narrow down the number of respective node pairs within a space defined for the radiofrequency-based motion detection; and/or search said space only for a specific body mass bucket (e.g. for a big person rough RF-based sensing resolution will suffice).

Further: In aspects, radiofrequency-based sensing can also do true-presence detection of a static object e.g. person on a couch. Radiofrequency-based sensing can also perform heuristic people counting (versus merely detecting that a room is occupied/unoccupied). Moreover, high-resolution spatial radiofrequency-based sensing scans will enable to "asset track" a certain bio mass (e.g. a person) over time through the building. Radiofrequency-based sensing can also determine the activity level within a room, e.g. everyone in a meeting room working on a computer versus actively engaging with each other.

Thus, the present invention may not be limited to radiofrequency-based motion detection, but may in further aspects of the invention be related to radiofrequency-based occupancy detection, object counting (such as e.g. assets and/or people), and/or location-based services (such as e.g. radiofrequency-based navigation). Thus, advantages and/or embodiments applying to the controller and/or system according to the invention may also apply mutatis mutandis to the present aspects of the invention which relate to radiofrequency-based occupancy detection, object counting and/or location-based services.

Hence, it is an object of the invention to provide an improved controller for performing radiofrequency-based services, which at least alleviates the problems mentioned above. Thereto, the invention provides a controller for controlling a wireless network comprising a plurality of nodes to perform radiofrequency-based services, wherein each unique pair of the plurality of nodes forms a respective node pair and collectively results in a plurality of node pairs, wherein the controller is configured to: select a reference node pair from the plurality of node pairs; obtain at least one reference characteristic of the reference node pair; select a subset of node pairs from the plurality of node pairs, wherein each respective node pair in the subset of node pairs comprises a respective characteristic matching the at least one reference characteristic; perform the radiofrequency-based services with said subset of node pairs. In an embodiment, said radiofrequency-based services may be at least one of: motion detection, occupancy detection, presence detection, object counting, asset tracking, location-based services, navigation, indoor navigation based on visible light communication. For example, the latter, indoor navigation based on visible light communication, may be advantageous as many light nodes within such an indoor navigation based on VLC may also comprise wireless connectivity based on RF.

BRIEF DESCRIPTION OF THE DRAWINGS

The invention will now be further elucidated by means of the schematic non-limiting drawings.

DETAILED DESCRIPTION OF THE EMBODIMENTS

As mentioned, it is an object of the invention to provide an improved system and/or controller for performing radiofrequency-based motion detection. The present invention advantageously leverages the respective node pairs which are relevant for the radiofrequency-based motion detection, and mitigates the disadvantageous contribution of the respective node pairs which are (at that moment, in operation) less relevant for the radiofrequency-based motion detection.

Figure 1:
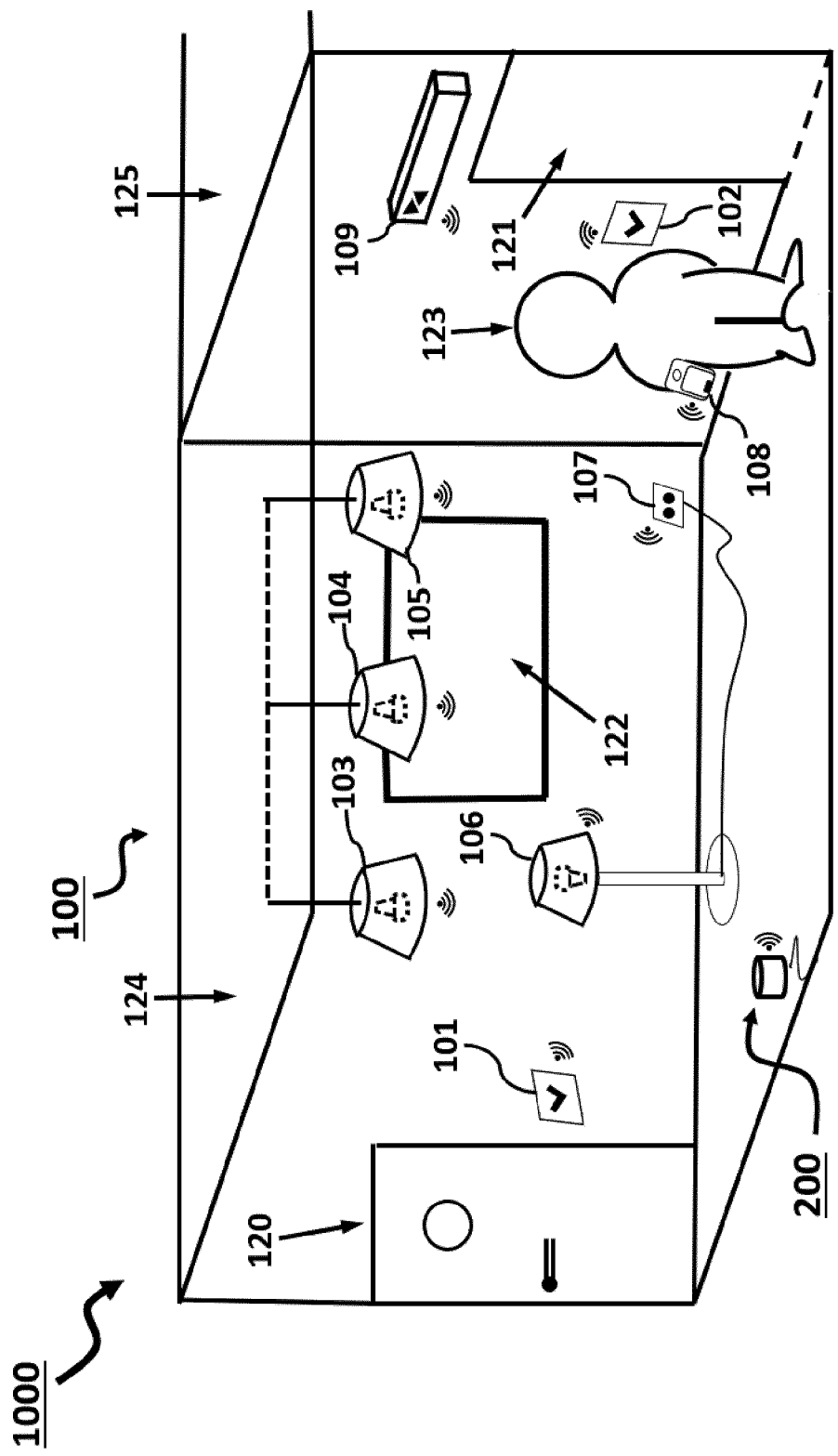
FIG. 1 depicts schematically an embodiment of a system according to the invention comprising the controller according to the invention, and a wireless network comprising a plurality of nodes.

FIG. 1 depicts schematically, by non-limiting example, an embodiment of a system 1000 according to the invention comprising the controller 200 according to the invention, and a wireless network 100 comprising a plurality of nodes 101, 102, 103, 104, 105, 106, 107, 108, 109, 200. The controller 200 is thereby embedded in a node of the wireless network 100 and makes part of the wireless network 100. The wireless network 100 is comprised within a room 124, but may alternatively be comprised within any other space. The room has an entrance 120, i.e. a door, and a passage 121 to another space, and a window 122. The wireless network 100 is a wireless lighting network 100, but wherein a node 109 from a home automation network is also in wireless connection therewith and included in the wireless lighting network. Alternatively, said wireless network is a home automation network, for example amongst home automation appliances; or a hybrid network of both home automation and lighting. Yet alternatively, said wireless network may be an asset tracking network suitable for RF based sensing.

The controller 200 is embedded within a node of the wireless lighting network 100. The controller is positioned on the floor of said room 124. The controller 200 is a bridge device. Said bridge device 200 controls and facilitates functions in said wireless lighting network. Said controller 200 may alternatively be any other device, such as a smart speaker, home assistant, or may comprise intelligence distributed amongst a plurality of nodes within the lighting network. Furthermore, a first node 101 and a second node 102 are a (smart) wall switch configured to control the wireless lighting network 100. The wall switches 101, 102 may for example switch luminaires and/or lamps within said wireless lighting network 100. The wall switches may in operation communicate with the controller 200, i.e. the bridge device. Furthermore, a third node 103, a fourth node 104, and a fifth node 105 are ceiling-mounted luminaires, which may be in (RF) communication with said wall switches 101, 102 and said controller (i.e. bridge device). Similarly, a sixth node 106 is a standing lamp comprising a smart light bulb with wireless connectivity, such as Signify Hue/Philips Hue. Furthermore, a seventh node 107 of the wireless lighting network 100 is a smart outlet plug 107. This smart outlet plug 107 is configured to be controlled wirelessly so as to provide appliances a power upon command. The standing lamp 106 is powered by said smart outlet plug 107. Furthermore, an eighth node 108 is formed by a smartphone device 108 which is being carried by a person 123 (i.e. object) to be detected within said room 124. The smartphone device 108 is running an application for connecting to said bridge device 200 (i.e. the controller according to the invention) and thereby is able to control all devices within said wireless lighting network. Alternatively, said smartphone device 108 may be the controller or be part of the controller according to the invention. A ninth node 109 is a smart air-conditioning (AC) appliance, which may normally be comprised within a wireless home appliance network, but now also communicates with the wireless lighting network 100, thereby being a node within the wireless lighting network 100; for example, because based on lighting to be on/off the AC appliance can derive whether or not people are present in the house and whether or not to cool.

Referring to FIG. 1, the wireless lighting network 100 is arranged for performing radiofrequency-based motion detection. Each node 101, 102, 103, . . . , 109, 200 comprises wireless connectivity and operating intelligence. The nodes 101, 102, 103, . . . , 109, 200 may detect wireless communication signals exchanged within the wireless lighting network 100, and record and report their radiofrequency observations to the controller 200 (i.e. the bridge device 200). Moreover, within said wireless lighting network 100, each unique pair of the plurality of nodes 101, 102, 103, . . . , 109, 200 may form a respective node pair. For example, the bridge device 200 may communicate with said smartphone device 108, thereby forming a respective node pair; the bridge device 200 may communicate with said first wall switch 101 and said second wall switch 102, thereby forming two distinct respective node pairs; the ceiling-mounted luminaires 103, 104, 105, and said floor lamp 106 may all four communicate with each other and exchange wireless communication signals such as lighting scenes or lighting commands, thereby with four unique nodes forming six additional respective node pairs. Thus, each unique pair of the plurality of nodes 101, 102, 103, . . . , 109, 200 results collectively in a plurality of node pairs (not referred to by numbering). Alternatively, in some examples, unique node pairs (e.g. A and B) may also be defined by assessing which node is the transmitter and which node is the receiver, such that two node pairs result from two unique nodes (e.g. AB and BA are different pairs, and so forth).

Thus, as mentioned, the nodes of a respective node pair may exchange wireless communication signals with each other. In a non-limiting example, a node pair may for example be formed by the controller 200 and the second wall switch 102, which e.g. exchange wireless communication signals comprising e.g. lighting control messages. Alternatively, such wireless communication signals may comprise software updates, diagnostics exchange, etcetera. Such an exchange of wireless communication signals may be used for radiofrequency-based sensing, such as radiofrequency-based motion detection. For example, in respect to an established baseline, a detection pattern may be determined by measuring a change of a parameter of the wireless communication signals exchanged between the controller 200 and the second wall switch 102 (being the respective node pair); wherein the change of the parameter may result from an interaction with said wireless communication signals. This change may also be phrased as a permutation(s) recorded by the respective node pair. This interaction may for example be rendered by the person 123 to be detected, which (with its body mass 'bucket') may interfere, disturb, delay, adsorb, and/or reflect said wireless communication signals exchanged between the controller 200 and the second wall switch 102.

Still referring to FIG. 1, a controller 200 is provided for controlling the wireless lighting network 100 comprising said plurality of nodes 101, 102, 103, . . . , 109, 200, in order to perform radiofrequency-based motion detection; wherein each unique pair of the plurality of nodes 101, 102, 103, . . . , 109, 200 forms a respective node pair and collectively results in a plurality of node pairs.

Some node pairs of the plurality of node pairs (of the wireless network 100) may be positioned optimally for detecting said motion of the person 123. Their recorded permutations may be relevant for the radiofrequency-based motion detection. For example, a node pair formed by the floor lamp 106 and the second wall switch 102 may be relevant to detect motion of the person 123 within the room 124, because both nodes 102, 106 are located at a center-body-height in respect to the person 123. The person may therefore interact well (e.g. with its body mass) with said exchange of wireless communication signals. However, some node pairs of the plurality of node pairs (of the wireless network 100) may be positioned less optimally for detecting said motion of the person 123 within the room 124. Their recorded permutations may be less relevant for the radiofrequency-based motion detection. For example, such a node pair may be formed by the ceiling-mounted luminaires 103, 104, 105 with each other.

When considering the permutations of all node pairs of the plurality of node pairs for the radiofrequency-based motion detection, all node pairs of the plurality of node pairs may report back to the controller 200, and thereby unnecessarily occupy the wireless lighting network 100 and/or unnecessarily burden a processing power of the controller 200. Therefore, a clear need is present to arbitrate between the node pairs of the plurality of node pairs and save bandwidth, when performing said radiofrequency-based motion detection in said room 124.

Therefore, still referring to FIG. 1, the controller 200 is configured to select a reference node pair from the plurality of node pairs. This reference node pair may e.g. be characterized as most suited and/or most exemplar for the (particular) motion of the person 123 to be detected via the radiofrequency-based motion detection. Here, as the detection of the person 123 within the room 124 is desired, the reference node pair may advantageously be said second wall switch 102 in pair with said controller 200. Thus, this is the reference node pair: [controller-second wall switch].

Here, the reference node pair is selected from the plurality of node pairs by means of a user input indicative of the reference node pair. Namely: The person 123 operates a user interface of the smartphone device 108, which is in wireless connection with the controller 200, to instruct the controller 200 to enter a commissioning phase (or: mode) for selecting said reference node pair (such instructing is merely exemplar and not necessary in other examples). The person 123 then selects via said user interface of the smartphone device 108 the wireless controller 200 from a list of all available nodes within the wireless network 100, which list may be populated by scanning said space 124 or assessing connections within said wireless network 100. Thereby, the wireless controller 200 itself becomes one node of the reference node pair. Alternatively, the user may select any other node from said list or from the wireless lighting network to be a node of the reference node pair, e.g. the floor lamp. Alternatively, both nodes of the reference node pair may directly be selected by the person, or a commissioner. The another node of the reference node pair is selected by the person 123 by controlling the second wall switch 102, while the controller is still in the commissioning phase (as the reference pair is not yet defined completely). Thus, the user input indicative of the reference node pair may at least comprise switching the second wall switch 102. The second wall switch 102 therefore becomes one node of the reference node pair. Alternatively, for example, if the person had switched the first wall switch 101, this wall switch would have formed the reference node pair together with the controller 200.

An alternative wherein the reference node pair is selected from the plurality of node pairs by means of a user input indicative of the reference node pair is by providing a location, via inputting or sensing said location in a user interaction device such as a tablet, or deriving said location from an image captured with a camera e.g. of smart glass, to the controller. The location may for example be the wall with the window of the room. The controller may then be configured to select a reference pair from nodes present within said location, or associated with said location. Here, the first wall switch and the smart outlet plug are present on the wall with the window of the room, thus the reference node pair may become [smart outlet plug-first wall switch]. Whenever multiple options for selecting the reference node pair exists by means of this alternative selection approach (or any other approach wherein multiple options arise), the controller may either randomly select the reference node pair, or provide all options back to e.g. the user interaction device select the node pair based on an additional user input, or select the reference node pair based on machine learning (of previously selected reference node pairs in such a situation, or based on detection properties, or based on a prestored ranking, etc.).

Alternatively, the user input comprises a selection of said reference node pair by a commissioner, which selects said reference node pair from a list of available nodes within the wireless network and sends said selected reference node pair directly to the controller, e.g. via a user interaction device, which is communicating with the controller. Especially in the office and retail domain, a commissioner may be advantageous to commission the system according to the invention by providing the most suited reference node pairs. Yet alternatively, the controller may receive an input indicating the reference node pair from a central server, for example setting the reference node pair of a plurality of similar to the reference node pairs already selected for e.g. adjacent apartments within an apartment complex. Yet alternatively: A user interaction device may also be used for navigating within said space, e.g. indoor positioning via VLC. Navigating via said user interaction device may then be suited to (automatically) select a closest reference node pair within a defined navigational path. For example, when the person leaves said room via the passage the reference node pair may comprise the nodes adjacent to said person, i.e. the second wall switch and the A/C device, because said nodes may provide the best characterization of the person in terms of radiofrequency-based detection pattern. Other nodes may therefore be selected which comprise a similar detection pattern.

As a result, the reference node pair [controller-second wall switch] is selected. Still referring to FIG. 1, the controller 200 is further configured to obtain at least one reference characteristic of the reference node pair. The at least one reference characteristic characterizes the node pair and, in the present embodiment, the at least one reference characteristic is a physical feature of the node pair itself. Namely, here, the at least one reference characteristic is a first reference characteristic being the location of the reference node pair relative to the floor of the space 124. This location is defined as the location in between the floor and two meters up from the floor (alternatively at most 1.6 meter up from the floor); because the controller 200 and the second wall switch 102 are both within said location in between the floor and two meters up from the floor. As many nodes within a wireless lighting network are aware of their location, either by their own sensing, or by commissioning said nodes, the controller may easily implement such a reference characteristic. This location is substantially at center-body-height of an average human being, therefore nodes corresponding to said reference characteristic may be well suited to detect a person. Here, the at least one reference characteristic is further a physical feature in an area surrounding a node of the reference node pair. Namely, a second reference characteristic is the presence of a solid wall directly adjacent to a node (e.g. because of the node being placed or mounted onto said solid wall). Such a solid wall may be well suited to reflect or project the wireless communication signals associated with nodes matching the second reference characteristic into the room 124.

Alternatively, as partly mentioned before, the reference characteristic may comprise one of: a material of a node of the reference node pair; a pre-defined combination of a node material of the nodes of the reference node pair; an orientation; a location relative to a wall and/or surface area; a distance between nodes of the respective node pair; a node type; a control setting; a classification of an activity detected by the reference node pair; a classification of a type of space in which the reference node pair is present.

Still referring to FIG. 1, the controller 200 selects a subset of node pairs from the plurality of node pairs. Each node pair in this subset of node pairs comprises a respective characteristic matching said at least one reference characteristic, which is here the first reference characteristic and the second reference characteristic. So, each node pair being present within the location in between the floor and 2 meters up from the floor, and having a solid wall directly adjacent to one of the nodes of the respective node pair, is selected to be part of the subset. Here, the node pairs within the subset are: [controller-second wall switch] which is the reference node pair; [controller-first wall switch] because the first wall switch 102 is also within said location and is mounted to the wall thereby matching the second reference characteristic; [controller-smart outlet plug] because the smart outlet plug 107 is also within said location and is mounted to the wall thereby matching the second reference characteristic; [second wall switch-smart outlet plug]; [second wall switch-first wall switch]; [first wall switch-smart outlet plug]. Though the respective characteristic (its height above the floor) of the floor lamp 106 matches the first reference characteristic, it does not match the second reference characteristic as smart light bulb comprising the wireless connectivity of the floor lamp is not directly adjacent to a solid wall (thereby e.g. not benefitting from the reflection of such a solid wall as mentioned above). Though the respective characteristic (its height above the floor) of the smartphone device 108 matches the first reference characteristic, it does not match the second reference characteristic as it is not directly adjacent to a solid wall. Therefore, the floor lamp 106 and the smartphone device 108 do not form part of the subset of node pairs.

The controller 200 is furthermore configured to perform the radiofrequency-based motion detection with at least said subset of node pairs. This subset may be well-suited for detection the motion of the person 123 within said space 124 as the node pairs within said subset are all at center-body-height and due to their adjacency to a solid wall are well-suited to reflect their wireless communication signals into said room 124. Here, the radiofrequency-based motion detection is performed with only said node pairs comprised within the subset of node pairs. Thus, the node pairs not belonging to said subset are discarded. Alternatively, whenever required for additional accuracy, the controller may also connect with said floor lamp or said smartphone device so as to include node pairs associated with those devices to be assessed in the radiofrequency-based motion detection. Yet alternatively, the controller may be configured to control the amount of network traffic to be exchanged between nodes of the respective node pairs for performing the radio-frequency based motion detection; wherein the network traffic exchanged between the nodes of the respective node pairs in the subset of node pairs may be increased, and/or wherein the network traffic exchanged between the nodes of the respective node pairs in the set of node pairs not belonging to said subset of node pairs may be decreased.

All in all, still referring to FIG. 1, radiofrequency-based motion detection may be performed with only a subset of node pairs, which subset may be well-suited for detecting said motion via radiofrequency-based motion detection and for rendering relevant permutations, and may not be performed with all node pairs of the plurality of node pairs, which may include less relevant node pairs for detecting said motion via radiofrequency-based motion detection and which may therefore unnecessarily occupy bandwidth or crowd the RF spectrum.

In an embodiment (not explicitly depicted, but implicitly referred in FIG. 1), a system and controller according to the invention is provided, which is partly similar to the embodiment in FIG. 1, but wherein the reference node pair is located within a first subspace and at least one node pair of the plurality of node pairs is located within a second subspace. Here, the first subspace is the room 124 in FIG. 1, and the second subspace is the adjacent room 125 thereto. Thus, the selections made according to the invention in respect to the first room 124 may be projected to the adjacent room 125, such that the controller 200 may also be suited to similarly (as the embodiment depicted in FIG. 1) perform radiofrequency-based detection in the adjacent room 125. The controller 200 may alternatively be a controller not being present in said subspaces, such as a general controller on house level, apartment level, complex level, neighborhood level, municipality level, etc. Therefore, the lessons learned from an improved radiofrequency-based motion detection within one space may be used in another space, e.g. the selections of the reference node pair and/or its at least one reference characteristic. Such a solution may be valuable in e.g. retail environments, wherein shops may be organized similarly. Or: office environment, wherein one floor or cubicle may be similarly organized in respect to another floor or cubicle.

Figure 2:
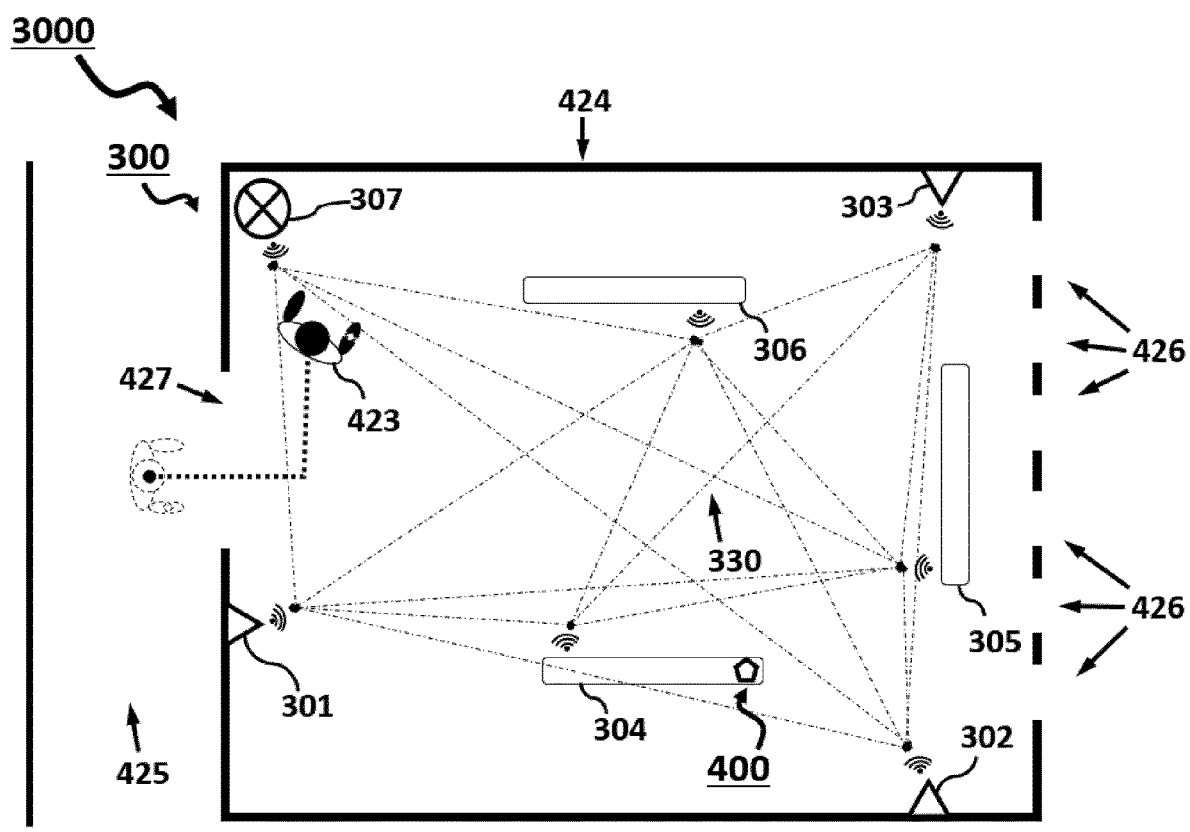
FIG. 2 depicts schematically an embodiment of a system according to the invention comprising the controller according to the invention, and a wireless network comprising a plurality of nodes.

FIG. 2 depicts schematically, by non-limiting example, an embodiment of a system 3000 and controller 400 according to the invention, which is partly similar to the embodiment in FIG. 1, but wherein the reference characteristic is a detection property of said reference node pair.

The system 3000 according to the invention is embodied within an office floor 424 adjacent to a corridor 425 and having one side with windows 426. The office floor 424 comprises a wireless network 300 comprising a plurality of nodes 301, 302, 303, 304, 305, 306, 307. The office floor has an entrance 427. An office worker 423 has walked into the office floor 424 through the entrance 427.

The first, second and third node 301, 302, 303 are respectively a first, second and third wall switch 301, 302, 303 with wireless connectivity to operate the lighting and/or home automation devices within said wireless network 300 and/or present with said office floor 424. The first wall switch 301 is on the wall adjacent to the corridor, whereas the second wall switch 302 and the third wall switch 303 are substantially next to the windows 426 of the office. The fourth, fifth, and sixth node 304, 305, 306 are respectively a first, second, third luminaire mounted to the ceiling of said office floor 424. The seventh node 307 is a lighting device 307 present in the office floor 424, such as a Philips Hue device, which placement is substantially next to the wall adjacent to corridor 425. The lighting device 307 and the first wall switch 301 are essentially next to the entrance 427 and are positioned at a center-body-height in respect to a person, for example the office worker 423.

The system 3000 also comprises a controller 400 according to the invention. The controller is a standalone device, but is integrated within the housing of the fourth node 304, which is one of the ceiling-mounted luminaires 304, 305, 306. Here, each unique pair of the plurality of nodes 301, 302, 303, 304, 305, 306, 307 forms a respective node pair and collectively results in a plurality of node pairs (not depicted).

Referring to FIG. 2, the wireless network 400 is arranged for performing radiofrequency-based motion detection. Each node 301, 302, 303, 304, 305, 306, 307 comprises wireless connectivity and operating intelligence. The nodes 301, 302, 303, 304, 305, 306, 307 may detect wireless communication signals 330 exchanged within the wireless network 300, and record and report their radiofrequency observations to the controller 400.

The controller 400 obtains, for each respective node pair, wireless communication signals 330 exchanged between nodes of the respective node pair, such as for example the wireless communication signals exchanged between the second wall switch 302 and the second luminaire 305. The controller 400 further determines, for each respective node pair, a detection pattern from the respective wireless communication signals. Each respective detection pattern is determined by measuring a change of a parameter of the respective wireless communication signals resulting from an interaction with said respective wireless communication signals. The parameter here is an RSSI value, but may alternatively be e.g. the number of retries in the message, or alternatively any other parameter related to network diagnostics.

The controller selects a reference node pair from the plurality of node pairs by obtaining an input signal indicative of an activity. The input signal indicative of an activity is received from a user input device of an installer, who has commissioned the system 3000 beforehand (e.g. that morning before workday). The input signal indicative of the activity comprises the activity of 'walking'. Therefore, the reference node pair is selected from the plurality of node pairs by selecting the node pair having detected said activity in the radiofrequency-based motion detection. Here, the node pair consisting of the first wall switch 301 and the floor lamp 307, which due to their positioning next to the entrance 427 generally sense the radiofrequency-based detection pattern of any office worker 423 entering said office floor 424 through the entrance 427. Thus, the reference node pair is the [first wall switch-the floor lamp]. Alternatively, said reference node pair may directly be selected from a list by said installer. Yet alternatively, reference node pair is selected from the plurality of node pairs by means of a user input indicative of the reference node pair is by providing a location, via inputting or sensing said location in a user interaction device such as a tablet, such as a location defining the entrance of the office floor.

The controller 400 further obtains a reference characteristic of the reference node pair. Here, the reference characteristic is the detection pattern of the reference node pair, which detection pattern is well able to provide a detection pattern corresponding to an office worker walking in, because the reference node pair is best located next to the entrance 427.

The controller 400 is subsequently selects a subset of node pairs from the plurality of node pairs. Each node pair in this subset of node pairs comprises a respective characteristic matching said at least one reference characteristic, i.e. the detection pattern corresponding to a 'walking' person of the reference node pair. Said matching of the reference characteristic and the respective characteristic comprises matching via statistical analysis of a detection pattern and via pattern analysis of a detection pattern. The controller 400 is able to retrieve and assess the historical detection patterns of the respective node pairs of the plurality of node pairs. The assessment evaluates which respective node pair is able to well detect the activity of 'walking'.

Figure 3:
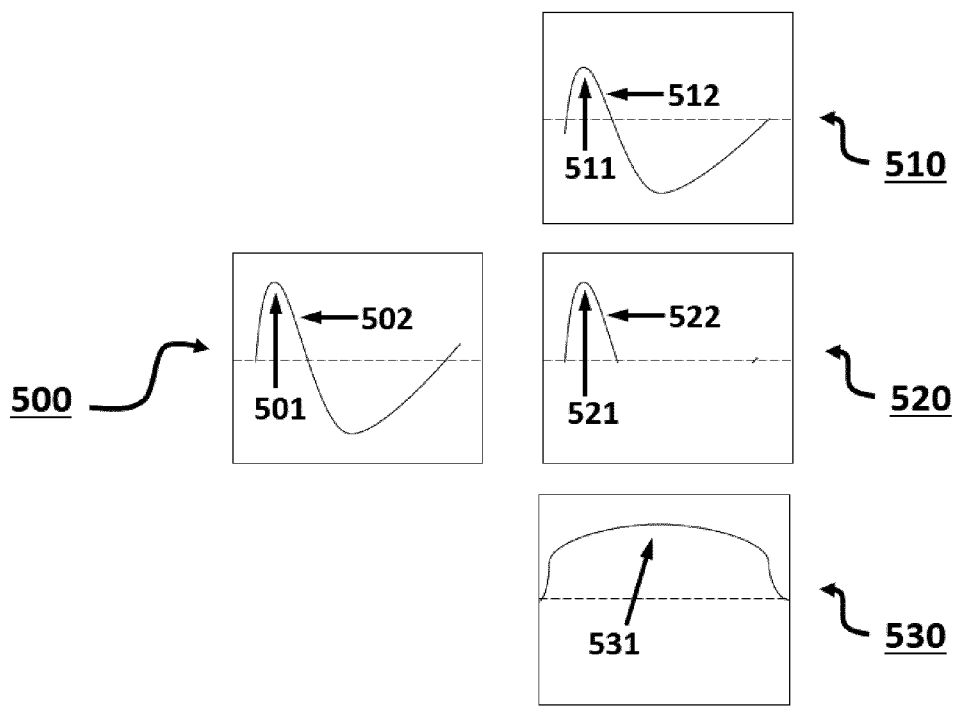
FIG. 3 depicts schematically a detection pattern of a reference node pair and detection patterns of respective node pairs related to said system depicted in FIG. 3.

Referring to FIG. 3, the detection pattern 500 of the reference node pair (i.e. the reference characteristic) comprises a distinct peak 501 for a first person with a reference shape 502, i.e. the office worker 423, entering said office floor 424. This distinct peak 501 and its reference shape 502 are utilized for said matching. The detection pattern 510, 520, 530 of three respective node pairs are also depicted in FIG. 3 (other detection patterns are not depicted for convenience). The detection pattern 510 of the first respective node pair relates to the pair consisting of the first luminaire 304 and the third luminaire 306. As said luminaires 304, 306 are positioned on the ceiling and look into the office floor via a top view, the detection pattern 510 of the node pair consisting of said luminaires 304, 306 may not comprise a peak 511 with a similar the height of the peak 501 in the detection pattern 500 of the reference node pair, but may still detect a shape 512 similar to the reference shape 502. Therefore, in this case, the respective characteristic of said respective node pair matches with the reference characteristic of the reference node pair. Similarly, the detection pattern 520 of the second respective node pair relates to the pair consisting of the first wall switch 301 and the third wall switch 303. As said wall switches 301, 303 are positioned at a center-body-height of an average office worker, the detection pattern 520 of the node pair consisting of said wall switches 301, 303 comprise a peak 521 with a same height of the peak 501 in the detection pattern 500 of the reference node pair, but may not be able to detect other additional features due to the placement of the third wall switch 303 in the corner of the office floor 424. However, these additional features are irrelevant for the detection of the activity of 'walking', as the activity of 'walking' is characterized by said distinct peak 501 in the detection pattern 500 reference node pair. Therefore, in this case, the respective characteristic of said respective node pair matches with the reference characteristic of the reference node pair.

The detection pattern 530 of the third respective node pair relates to the pair consisting of the second wall switch 302 and the third wall switch 303. As said wall switches 302, 303 are positioned next to the windows 426 and are not prominently in the center portion (e.g. subspace) of the office floor, the detection pattern 530 of the node pair consisting of said wall switches 302, 303 comprises a white noise pattern 531, e.g. due to interferences/interactions from the outside via said windows 426. Therefore, in this case, the respective characteristic of said respective node pair does not match with the reference characteristic of the reference node pair.

All in all, considering said examples above, it may be clear that the node pairs originating from a combination of the second wall switch 302, the third wall switch 303, and the second luminaire 305 are not able to well detect an activity of 'walking' because of their positioning next to the windows 426. The reference characteristic (i.e. their detection pattern) of these respective node pairs do not match with the reference characteristic (i.e. the detection pattern) of said reference node pair.

The reference characteristic of this embodiment may alternatively be an at least one reference characteristic, for example characterizing the walking of a first person and a second person, hence rendering two different detection patterns of the reference node pair, because the first person may be a thick person with a different body mass compared to the second person being a fat person. Thus, the at least one reference characteristic may be one or more detection patterns of the reference node pair.

Alternatively, as mentioned before, said matching of the reference characteristic and the respective characteristic may comprise matching one of: a shape of the detection pattern; a height of a peak of the detection pattern relative to a baseline; a depth of a peak of the detection pattern relative to a baseline; an area covered by the detection pattern relative to a baseline; a duration of the detection pattern; a classification of the detection pattern; a periodicity of the detection pattern; a history of previously detected detection patterns.

Alternatively, not assessing the detection patterns, but assessing the location of the nodes within said office floor, e.g. because their physical location may be known already, the controller may also select a subset of node pairs based on the location of the node pairs with respect to the window.

Still referring to FIG. 2 and/or FIG. 3, summarizing, the controller 400 is configured to select a reference node pair from the plurality of node pairs, obtain a detection pattern of the reference node pair, and select a subset of node pairs from the plurality of node pairs, wherein each respective node pair in the subset of node pairs comprises a respective detection pattern matching the detection pattern of the reference node pair. Consequently, the controller 400 will perform the radiofrequency-based motion detection with only said subset of node pairs (i.e. leaving out the node pairs formed with the second wall switch 302, the third wall switch 303 and the second luminaire 305, due to their positioning next to the window). Thus, it is ensured that the radiofrequency-based motion detection is performed with node pairs having more relevant permutations and/or more accurate detection patterns, for detecting said selected activity of 'walking' in the office floor.

All in all, still referring to FIG. 2 and/or FIG. 3, radiofrequency-based motion detection may be performed with only a subset of node pairs, which subset may be well-suited for detecting said motion via radiofrequency-based motion detection and for rendering relevant permutations, and may not be performed with all node pairs of the plurality of node pairs, which may include less relevant node pairs for detecting said motion via radiofrequency-based motion detection and which may therefore unnecessarily occupy bandwidth or crowd the RF spectrum.

Figure 4:
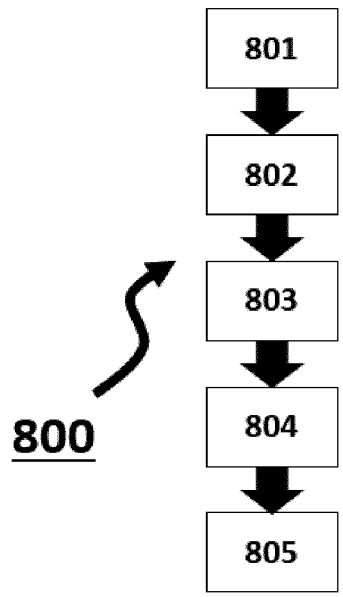
FIG. 4 depicts schematically an embodiment of a method according to the invention.

FIG. 4 depicts schematically, by non-limiting example, a method 800 of controlling a wireless network comprising a plurality of nodes to perform radiofrequency-based motion detection. Each unique pair of the plurality of nodes forms a respective node pair and collectively results in a plurality of node pairs. The method 800 comprises a first step 801 of the controller receiving a user input from a user interaction device, wherein the user input is indicative of a reference node pair. In a second step 802, the controller selects the reference node pair from the plurality of node pairs indicated in the user input. Alternatively, said method may also start by other means of selecting said reference node pair, for example by machine learning, by evaluation of measurements within the wireless network, or by means of a sensor input. A third step 803 is obtaining at least one reference characteristic of the reference node pair. The controller further selects, in a fourth step 804 of the method 800, a subset of node pairs from the plurality of node pairs, wherein each respective node pair in the subset of node pairs comprises a respective characteristic matching the at least one reference characteristic. In a final step 805 of the method 800, the controller performs the radiofrequency-based motion detection with said subset of node pairs.

Alternatively, additionally, the method according to the invention may comprise; determining, for each respective node pair, a detection pattern from the respective wireless communication signals by measuring a change of a parameter of the respective wireless communication signals resulting from an interaction with said respective wireless communication signals; wherein said reference characteristic is the detection pattern of the reference node pair, and wherein said respective characteristic is the detection pattern of the respective node pair.

The invention claimed is:

1. A controller for controlling a wireless network comprising a plurality of nodes to perform radiofrequency-based motion detection, wherein each unique pair of the plurality of nodes forms a respective node pair and collectively results in a plurality of node pairs, wherein the controller is configured to:
select a reference node pair from the plurality of node pairs;
obtain at least one reference characteristic of the reference node pair;
select a subset of node pairs from the plurality of node pairs, wherein each respective node pair in the subset of node pairs comprises a respective characteristic matching the at least one reference characteristic;
perform the radiofrequency-based motion detection with c said subset of node pairs.

2. The controller according to claim 1, wherein the controller is configured to:
obtain, for each respective node pair, wireless communication signals exchanged between nodes of the respective node pair;
determine, for each respective node pair, a detection pattern from the respective wireless communication signals by measuring a change of a parameter of the respective wireless communication signals resulting from an interaction with said respective wireless communication signals; and wherein said reference characteristic is the detection pattern of the reference node pair, and wherein said respective characteristic is the detection pattern of each respective node pair.

3. The controller according to claim 2, wherein the parameter is an RSSI value.

4. The controller according to claim 2, wherein said matching of the reference characteristic and the respective characteristic comprises matching one of:
- a shape of the detection pattern;
- a height of a peak of the detection pattern relative to a baseline;
- a depth of a peak of the detection pattern relative to a baseline;
- an area covered by the detection pattern relative to a baseline;
- a duration of the detection pattern;
- a classification of the detection pattern;
- a periodicity of the detection pattern;
- a history of previously detected detection patterns.

5. The controller according to claim 1, wherein the reference characteristic and the respective characteristic comprise one of:
- a material;
- a pre-defined combination of a node material of the nodes of the reference node pair;
- an orientation;
- a location relative to a wall and/or surface area;
- a distance between nodes of the respective node pair;
- a node type;
- a control setting;
- a classification of an activity detected by the reference node pair;
- a classification of a type of space in which the reference node pair is present;
- a power supply type and/or status of a node;
- a transmit power of a node;
- a software edition of an operating system of a node.

6. The controller according to claim 1, wherein the reference node pair is located within a first subspace and at least one node pair of the plurality of node pairs is located within a second subspace;
wherein the first subspace is different to the second subspace.

7. The controller according to claim 6, wherein the first subspace is a first room, and wherein the second subspace is a second room.

8. The controller according to claim 1, wherein the wireless network is at least a wireless lighting network.

9. The controller according to claim 1, wherein the plurality of nodes comprises one of: a lighting device, a wall switch, a bridge, a speaker, a television, a thermostat, a power outlet plug, and/or a smart home appliance.

10. The controller according to claim 1, wherein the controller is configured to:
receive a user input indicative of the reference node pair;
wherein the controller is configured to select the reference node pair from the plurality of node pairs by selecting the reference node pair indicated in the user input.

11. The controller according to claim 1, wherein the controller is configured to:
obtain an input signal indicative of an activity;
select the reference node pair from the plurality of node pairs by selecting a node pair having detected said activity in the radiofrequency-based motion detection.

12. A system of controlling a wireless network comprising a plurality of nodes to perform radiofrequency-based motion detection, wherein the system comprises:
the plurality of nodes of the wireless network;
a controller according to claim 1.

13. A method of controlling a wireless network comprising a plurality of nodes to perform radiofrequency-based motion detection, wherein each unique pair of the plurality of nodes forms a respective node pair and collectively results in a plurality of node pairs, wherein the method comprises:
selecting a reference node pair from the plurality of node pairs;
obtaining at least one reference characteristic of the reference node pair;
selecting a subset of node pairs from the plurality of node pairs, wherein each respective node pair in the subset of node pairs comprises a respective characteristic matching the at least one reference characteristic;
performing the radiofrequency-based motion detection with only said subset of node pairs.

14. The method according to claim 13 further comprising:
obtaining, for each respective node pair, wireless communication signals exchanged between nodes of the respective node pair;
determining, for each respective node pair, a detection pattern from the respective wireless communication signals by measuring a change of a parameter of the respective wireless communication signals resulting from an interaction with said respective wireless communication signals;
wherein said reference characteristic is the detection pattern of the reference node pair, and wherein said respective characteristic is the detection pattern of the respective node pair.

15. A computer program product for a computing device, the computer program product comprising computer program code to perform the method of claim 13 when the computer program product is run on a processing unit of the computing device.

* * * * *

UNITED STATES PATENT AND TRADEMARK OFFICE
CERTIFICATE OF CORRECTION

PATENT NO. : 11,343,897 B2
APPLICATION NO. : 17/272293
DATED : May 24, 2022
INVENTOR(S) : Peter Deixler and Hugo José Krajnc It is certified that error appears in the above-identified patent and that said Letters Patent is hereby corrected as shown below:

In the Claims

Claim 1, Column 28, Line 56 replace "c" with --only--.

Signed and Sealed this
Eleventh Day of July, 2023

Katherine Kelly Vidal
*Director of the United States Patent and Trademark Office*